United States Patent
Gonsalves

(10) Patent No.: US 7,781,712 B2
(45) Date of Patent: Aug. 24, 2010

(54) ELIMINATION OF PISTON WRAPS IN SEGMENTED APERTURES BY IMAGE-BASED MEASUREMENTS AT TWO WAVELENGTHS

(76) Inventor: Robert A. Gonsalves, 12 Lexington St., Woburn, MA (US) 01801

( * ) Notice: Subject to any disclaimer, the term of this patent is extended or adjusted under 35 U.S.C. 154(b) by 0 days.

(21) Appl. No.: 12/477,011

(22) Filed: Jun. 2, 2009

(65) Prior Publication Data

US 2009/0302198 A1     Dec. 10, 2009

Related U.S. Application Data

(60) Provisional application No. 61/059,909, filed on Jun. 9, 2008.

(51) Int. Cl.
*G02B 23/00* (2006.01)

(52) U.S. Cl. .............. 250/201.9; 356/456; 356/512

(58) Field of Classification Search .............. 250/201.9, 250/201.1; 356/121, 399, 456, 497, 512; 359/419, 429
See application file for complete search history.

(56) References Cited

U.S. PATENT DOCUMENTS 5,610,707 A * 3/1997 Duncan et al. .............. 356/121

\* cited by examiner

*Primary Examiner*—Kevin Pyo

(57) ABSTRACT

A segmented array, perfectly aligned except for piston wraps, will have perfect imaging at wavelength $\lambda$ but will have degraded imaging at other wavelengths. The present method detects and corrects piston wraps by making image-based measurements at a wavelength $\lambda$ and a second wavelength $\lambda_1$. These measurements will produce an image of the piston-wrapped segments and the intensities of these segments in the image at wavelength $\lambda_1$ are linearly related to the sizes of the piston wraps at wavelength $\lambda$. The method needs no additional equipment like inter-segment apertures, lenslets, and detectors. It needs only a narrowband filter to change the measurement wavelength from $\lambda$ to $\lambda_1$.

2 Claims, 2 Drawing Sheets

(a) Phase of Piston Wraps at Wavelength $\lambda$ (b) Phase of Piston Wraps at Wavelength $\lambda_1 = \lambda/1.1$

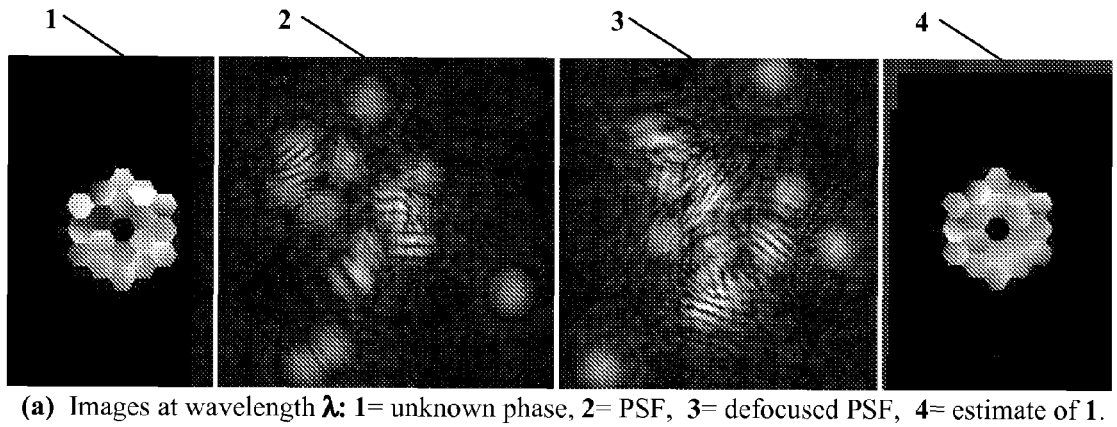

(a) Images at wavelength $\lambda$: 1= unknown phase, 2= PSF, 3= defocused PSF, 4= estimate of 1.

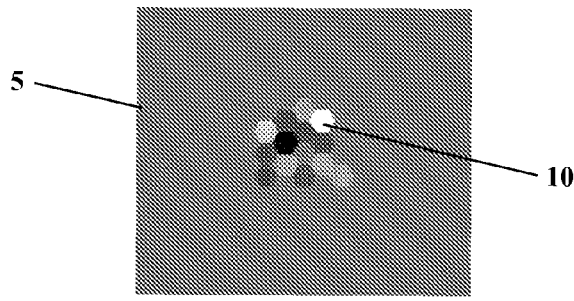

(b) Residual phase error $\varepsilon$ = 1-4 shows piston wraps. $\varepsilon$ is not directly observable.

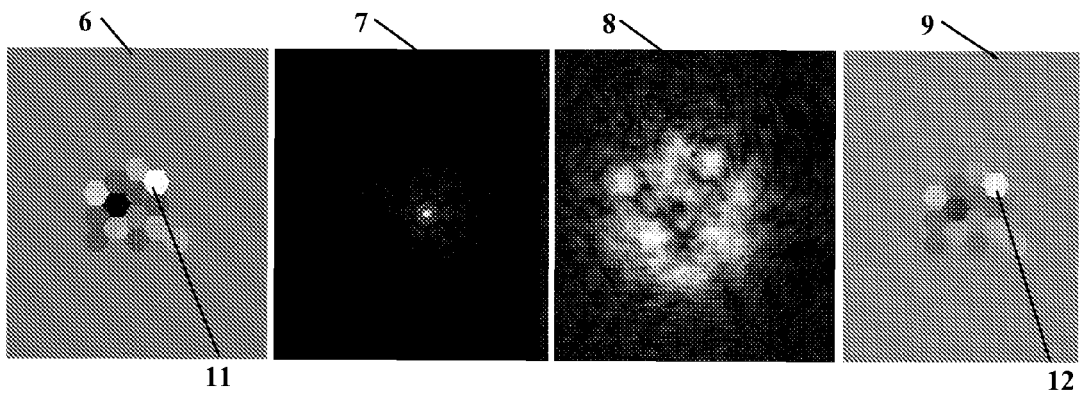

(c) Images at wavelength $\lambda_1$: 6= unknown phase, 7= PSF, 8= defocused PSF, 9= estimate of 6
Image 9 is observable, is linearly related to $\varepsilon$ in 5, and allows estimation of the piston wraps.

Figure 3

ELIMINATION OF PISTON WRAPS IN SEGMENTED APERTURES BY IMAGE-BASED MEASUREMENTS AT TWO WAVELENGTHS

This application claims the benefit of U.S. Provisional Application No. 61/059,909, filed Jun. 9, 2008.

BACKGROUND OF THE INVENTION

1. Field of the Invention

The invention relates to phasing the segmented aperture of a telescope to ensure good image quality. In particular we give a simple, image-based method to detect and correct piston errors which are integer multiples of the central wavelength $\lambda$.

2. Description of Prior Art

A segmented aperture has mirror segments which are phased separately to combat instabilities associated with the size of the mirror. A typical system is the Keck telescope in Hawaii which has 36 segments in each of two telescopes [2] and another is the James Webb Space Telescope (JWST), currently under development, which has 18 segments [3]. Good image quality is achieved when the segments are perfectly phased, that is, when the segments are positioned to mimic an ideally shaped, single mirror.

Telescopes with a segmented aperture use a plurality of methods to align the segments. See U.S. Pat. Nos. 3,842,509, 4,946,280, 5,109,349, 5,113,064, 5,128,530, 6,649,895, and 7,372,569; and References [2-9]. The most common method is a dispersed Hartmann sensor, which measures light from a point source as seen through multiple apertures positioned to overlap adjacent segments. Two examples of this method are in U.S. Pat. No. 6,649,895, entitled, "Dispersed Hartmann sensor and method for segment alignment and phasing," and in U.S. Pat. No. 7,372,569, entitled, "Method of correcting alignment errors in a segmented reflective surface." The former uses a Hartmann lenslet and a dispersive element to measure the size of discontinuities in the wavefront; and the latter has sub-apertures across the abutting edges of reflective segments and sensors for each of the sub-apertures.

The present invention is much simpler than a dispersed Hartman sensor. It uses image-based wavefront sensing, whereby images measured in the focal plane of a telescope are processed by computer to estimate the phase in the aperture of the telescope. The first such image-based wavefront sensor was disclosed in U.S. Pat. No. 4,309,602 by Gonsalves, et al. and modifications are in U.S. Pat. Nos. 5,384,455 and 6,107, 617. References [2] through [19] describe additional background on image-based wavefront sensing. The method was used in 1990 to estimate the flaw in the Hubble Space Telescope [19].

The James Webb Space Telescope will use dispersed Hartmann sensing for coarse phasing of its 18 segments and monochromatic, image-based wavefront sensing for fine phasing [3,9]. The latter method will also use phase diversity, a method disclosed in U.S. Pat. No. 4,309,602 and described fully in Reference [14].

A segmented aperture presents an interesting challenge for such a monochromatic, image-based wavefront sensor. The method is subject to "piston ambiguity" [1], wherein segments can be displaced by a non-zero multiple of $\lambda$, the wavelength of the measured data, but the displacements are unobservable at that wavelength. When a segment is so displaced we say that it has a "piston wrap."

In Reference [1] Löfdhal and Ericksson discuss piston ambiguity in the context of phasing the Keck II telescope. They study the well-known benefit of wideband measurements to reduce piston ambiguity and suggest appropriate wavelengths at which to make measurements based on the theory of continued fractions.

In contrast to Reference (1) which provides no process, machine or article of manufacture to reduce the authors' theory to practice, the present invention is a new, unobvious, and useful method to measure and to correct piston ambiguities. The present invention uses focal plane measurements at one wavelength $\lambda$ to make an initial alignment of the segments. Then it uses focal plane measurements at a new wavelength $\lambda_1$ to form a unique image of the piston wraps. The method is simple and direct.

The prior art for this invention includes image-based wavefront sensing in the form of phase-diverse phase retrieval. This prior art includes U.S. Pat. Nos. 4,309,602, 5,384,455, and 6,107,617; and References [2-4, 9-17]. This is a mature technology with two basic approaches: (1) the iterative transform algorithm (ITA), in which the wavefront (phase in the aperture) is estimated, iteratively, by imposing physical constraints in spatial and in spatial frequency domains; and (2) model-based phase retrieval (MBPR) in which a weighted sum of basis functions is manipulated so that a model for the data fits the observed data. The observed data is often an image in best focus and one or more images out of focus.

The continuity of phase across each segment of the aperture ensures that phase-retrieval-based algorithms will give high-quality estimates across each segment. But potential discontinuities between segments allow the piston estimates to have piston wraps. These wraps are not detectable at the measurement wavelength $\lambda$. The telescope might have perfect imaging at wavelength $\lambda$ but the telescope could have degraded imaging at other wavelengths. This will cause distortion in wideband (multi-colored) images which fall on a broadband detector.

SUMMARY OF THE INVENTION

The present invention gives a method to remove piston wraps in the segmented mirror of a telescope when image-based wavefront sensing is used to align the segments. Such piston wraps are undetectable at the center wavelength $\lambda$ and they produce no image degradation at that wavelength. But images at other wavelengths will be degraded if piston wraps are present at wavelength $\lambda$. To check for piston wraps and to quantify them, we make additional, image-based measurements at a new wavelength $\lambda_1$. By careful selection of $\lambda_1$ we force the piston-wraps to appear within $\pm \lambda_1/2$, which is the detectable range of positions at $\lambda_1$. The resulting estimate of the phase at $\lambda_1$ presents an observed image which is a scaled version of the unobservable image of the piston wraps at wavelength $\lambda$. This image can be used to measure and remove the piston wraps at wavelength $\lambda$ and to complete the phasing (alignment) of the telescope.

BRIEF DESCRIPTION OF THE DRAWINGS

and FIG. 3 is a set of images of outputs from the segmented aperture, the camera, and the phase retrieval algorithm.

DESCRIPTION OF THE PREFERRED EMBODIMENT

Figure 1:
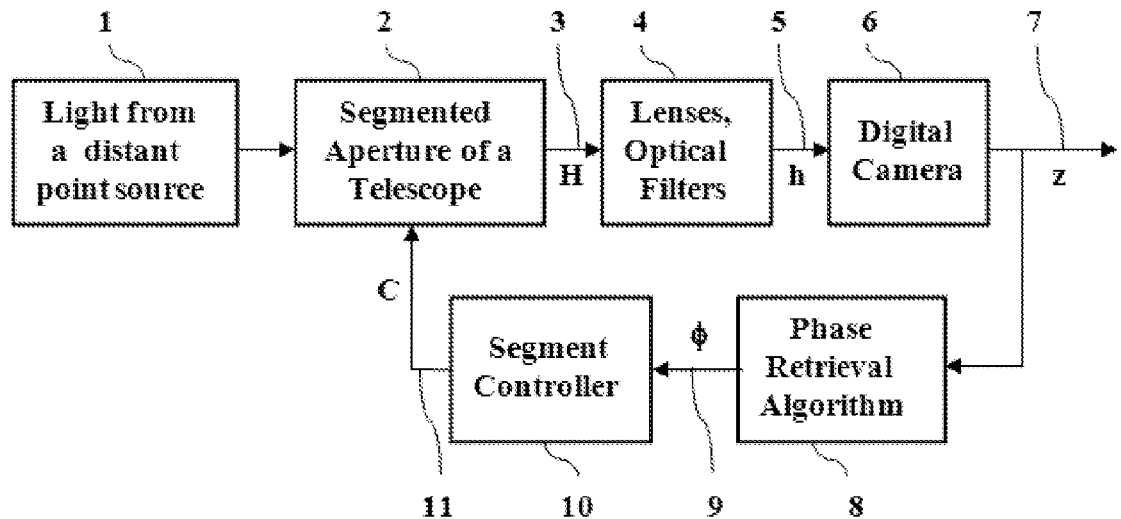
FIG. 1 is a diagrammatic representation of the telescope imaging system. It uses a segmented aperture, a narrowband spectral filter, a camera, a phase retrieval algorithm, and a control device to control the segmented aperture.

FIG. 1 is a block diagram which shows the flow of optical and digital information which causes the segmented aperture of a telescope to be aligned, or "phased," in accordance with the preferred embodiment of the present invention. Our description of FIG. 1 uses well-know principles of physical optics.

The telescope receives light from a distant point source 1. This light is gathered by a segmented aperture 2, whose output 3 is a coherent light signal, H, given by $$H = A \exp(i\,\theta). \tag{1}$$

In Equation (1) A is a zero-one aperture function shown, later, in FIG. 3 and $\theta$ is the segmented aperture's phase function whose shape is revealed by typical phases also shown in FIG. 3. Ideally, the segmented mirror is shaped like a perfect imaging mirror so, by convention, we treat $\theta$ as the deviation from that perfect shape. With this convention a perfectly phased telescope has $\theta$ identically equal to zero. $\theta$ is called the phase, or wavefront, of the optical system and it is $\theta$ that is to be sensed and zeroed in the phasing of the telescope.

The light signal 3 is a converging beam, H, which passes through optical filters and defocusing lenses 4 to form another coherent light signal h at the input 5 to the digital camera 6. The optical signal h entering the camera is the Fourier transform of the optical signal H. h falls on the focal plane of the camera. A detector senses the modulus square of h, samples it and produces a digital image, z, at the output 7 of the camera. Thus, $$z = h\,h^*, \tag{2}$$

where z is a sampled array (256 by 256 samples in the images of FIG. 3); and * represents the complex conjugate.

The output z of the camera is used for scientific observations and it is also the input to the Phase Retrieval Algorithm 8. The latter is a combination of hardware and software which receives digital images from the camera and processes the images to form another digital image $\phi$, which is an estimate 9 of the current phase, $\theta$, of the segmented aperture. The process is called phase-diverse phase retrieval, as outlined in the discussion on prior art. The Segment Controller 10 has input $\phi$ and it produces a vector of parameters, C, to control the segmented mirror. This control vector is designed to change the parameters of the segmented aperture, typically 3 to 6 parameters per segment, so as to best cancel the current phase of the segmented aperture. After the segmented mirror is adjusted it will have a residual phase $\epsilon$, $$\epsilon = \theta - \phi. \tag{3}$$

The residual phase $\epsilon$ is where piston wraps can occur.

Figure 2:
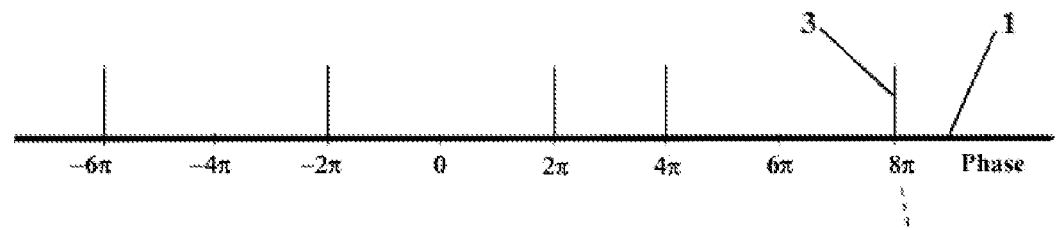
FIG. 2 is a idealized representation of the piston wraps at wavelengths $\lambda$ and $\lambda_1$.
Figure 2:
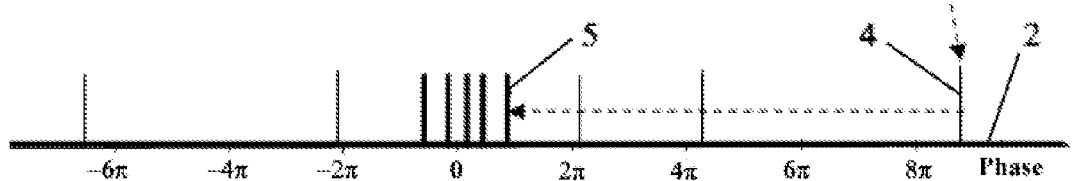

FIG. 2 gives some details on how we detect and measure piston wraps and how we select the wavelength $\lambda_1$. FIG. 2(a) shows five piston wraps in the residual phase $\epsilon$ at wavelength $\lambda$. The x-axis 1 is the phase associated with each piston wrap. A wrap of size $\lambda$ introduces a phase of $2\pi$ radians into the aperture at the location of the piston-wrapped segment; a wrap of size $2\lambda$ introduces a phase of $4\pi$, etc. If the five wraps have sizes $-3\lambda$, $-\lambda$, $\lambda$, $2\lambda$ and $4\lambda$ they will introduce phases of size $-6\pi$, $-2\pi$, $2\pi$, $4\pi$ and $8\pi$, respectively. The wrap of size $8\pi$ (or $4\lambda$) is identified as 3 in FIG. 2.

Note that all five of these piston wraps will, at wavelength $\lambda$, be estimated as pistons with displacements of zero and with phases of zero, because the Phase Retrieval Algorithm can measure discontinuous phases, like piston displacement, only to modulo $2\pi$. To detect the piston wraps we remove the estimated phase, $\phi$, from the true phase, $\theta$, and make a second set of measurements at a new wavelength $\lambda_1$.

In this example we select $\lambda_1$ to be smaller than $\lambda$ by a factor $F = 1.1$. Thus, $$\lambda_1 = \lambda/F = \lambda/1.1. \tag{3}$$

A change in wavelength means that the phase at the new wavelength will also be changed. In this instance a reduction in wavelength causes an increase in phase. The new residual phase at wavelength $\lambda_1$ is $\epsilon_1$, $$\epsilon_1 = F\,\epsilon = 1.1\epsilon. \tag{4}$$

FIG. 2(b) shows the phases of the five piston wraps for the residual phase $\epsilon_1$. Note that the $8\pi$ piston wrap at wavelength $\lambda$ will be increased to $4\,(1.1)\,(2\pi)$ at wavelength $\lambda_1$. This piston wrap is shown as 4 in FIG. 2. It is located at position $8.8\pi$. The dotted arrow from 3 to 4 indicates the correspondence between the positions. The other four piston wraps for $\epsilon_1$ are mapped, accordingly.

The wrap 4 will be estimated by the Phase Retrieval Algorithm at wavelength $\lambda_1$ as a phase of $0.4\,(2\pi)$, as seen by the bold line 5 in FIG. 2, because of the modulo $2\pi$ nature of the algorithm. This modulo ($2\pi$) process is indicated by the horizontal arrow pointing from 4 to 5. Similar transformations occur for the other four piston wraps. From left to right the piston wraps appear on the phase axis 2 at positions $-0.6\pi$, $-0.2\pi$, $0.2\pi$, $0.4\pi$, and $0.8\pi$, all within $\pm\pi$ (or $\pm\lambda_1/2$).

To complete the process of detection and elimination of piston wraps we multiply these phases by a factor of 10 to identify the piston wraps at wavelength $\lambda$, construct an estimate, $\phi_1$, of the residual error and send it to the Segment Controller, which will change the appropriate segments to remove the piston wraps.

Our strategy in selecting the factor 1.1 for wavelength is explained as follows. There are two principal considerations. The first is the size of the expected piston wraps. If the size is bounded by $\pm R$ wraps, we should select the factor F to accommodate this range. We know that the measurements at $\lambda_1$ will be multiplied by a magnification factor, M, given by $$M = 1/(F-1), \tag{5}$$

to get the size of the piston wrap at $\lambda$. Moreover we want the size of the detected piston wraps to be inside the unambiguous range of positions at wavelength $\lambda_1$. So it is reasonable to set $$M = 2R,$$

which, with Equation (5), allows us to solve for F:

$$F = 1 + 1/(2R). \tag{6}$$

For a maximum of 4 wraps we might set R=5 (for a little guard band) and get $$F = 1 + 1/10 = 1.1. \tag{7}$$

This is how we chose F for the example in FIG. 2. If the largest wrap to be expected is two, we could set R=3 and get F=1.166. For R=10 we would set F=1.05.

The second consideration is error in the estimation of $\epsilon_1$. This error depends on the amount of noise on the observed data and, to a lesser degree, on the complexity of $\epsilon_1$. As data noise increases the error in estimating the size of a piston wrap will also increase. Thus, a piston wrap of size $3\lambda$ might be estimated as a piston wrap of $2\lambda$ or $4\lambda$. Clearly a user should chose F to get as much separation as possible between levels of the piston wraps, which implies keeping F as large as possible. So the choice of F is a balancing of R, the "capture range," for piston wraps vs. separation between values of the piston positions in the limited range of displacement $\pm\lambda_1/2$ (phase=$\pm\pi$).

We note that one strategy to form a large capture range is to use a small value of F, say F=1.02, which will accommodate a piston range of $\pm25\lambda$. Perform a first estimation of the piston wraps with the expectation that some mistakes will be made. For example a phase wrap of $5\lambda$ might be estimated as $6\lambda$. When this estimate is subtracted from the segments, the size of the piston wraps will be greatly reduced. The process can be repeated for a larger F, say F=1.166.

Other strategies can be adopted. For example, one can use values of F which are smaller than 1. This will increase the size of the new wavelength, $\lambda_1$, and decrease the positions of the wrapped pistons. We can show that the estimated phase at $\lambda_1$ will look like the negative of the phase at $\lambda$, but the appropriate mapping procedures can be worked out by one skilled in the art.

FIG. 3 shows images which are calculated in a computer simulation of the formation, detection, estimation, and elimination of piston wraps. FIG. 3(a) shows images generated for wavelength $\lambda$. FIG. 3(b) shows piston wraps resulting from measurements at wavelength $\lambda$. FIG. 3(c) shows measurements at wavelength $\lambda_1$, after the phase estimate at wavelength $\lambda$ is subtracted from the actual, unknown phase at wavelength $\lambda$.

The mirror in our example has 18 segments with an obscuration in the center. The original phase, $\theta$, on the segments is at 1 in FIG. 3. The phase was formed by assigning 3 parameters to each segment: x-tilt, y-tilt, and piston. In this simulation all parameters were drawn from a set of independent, zero-mean, Gaussian, random variables. The zero-one aperture shape, A, is obvious from this first image. $\theta$ and A form the complex function H as in Equation 1.

The digital image, z, measured by the camera is shown at 2. This image is data for an unaligned telescope. The optical energy from all segments is captured by the camera.

Image quality can be measured by the Strehl ratio, the maximum value in the measured image of a distant point object divided by the maximum value of the corresponding image for a perfectly phased mirror. The Strehl ratio for this first image is 0.020, a telescope with very poor alignment.

The second image, at 3, is formed by inserting a defocusing lens into the optical path as shown in FIG. 1. This is a diverse image which is used by the Phase Retrieval Algorithm to estimate phase $\theta$, as described in the section on prior art.

The image at 4 is the estimate, $\phi$, of $\theta$, produced by the Phase Retrieval Algorithm. It looks like the image at 1 but on close inspection one can see piston wraps. These become more evident when we subtract $\phi$ from the $\theta$ in the aperture. The difference image, $\epsilon$, is shown in FIG. 3(b) at 5.

We emphasize that this residual image, $\epsilon$, is not observable. We can show it only in simulations such as we describe here, because we know both the input phase and its estimate. Also, piston wraps in $\epsilon$ do not effect the imaging performance at wavelength $\lambda$. In fact, in this example the Strehl ratio for the residual phase $\epsilon$ is 0.998, which indicates a diffraction-limited imaging condition at wavelength $\lambda$.

Close inspection of $\epsilon$ shows that it has no noticeable tilt components. It is made up of discrete jumps in the segment positions. This is typical in our application: the Phase Retrieval Algorithm has no difficulty finding tilt positions to a high degree of accuracy. Therefore we will continue to examine, in detail, only the piston parameters.

It is instructive to look at the piston values for $\epsilon$. This is an 18-component vector $P_0$ given by $$P_0=[-100.45, -100.15, 100.40, -99.48, 99.15,\\
-300.17, 99.12, 400.71, -0.49\ 0.55, 99.71, 0.00\\
0.31, 0.03, -99.75, -100.70, 200.29, -100.11], \quad (8)$$

where the elements of $P_0$ are the piston positions expressed as a percentage of a wavelength $\lambda$. Thus the $8^{th}$ element of $P_0$ is 400.71 which means that segment 8 is displaced by slightly over $4\lambda$ in position. It has a piston wrap of size $4\lambda$. This is the segment identified as 10 in FIG. 3(b). Equation 8 shows that there is one piston wrap of size $-3\lambda$, six of size $-\lambda$, four of size $\lambda$, one of size $2\lambda$, and one of size $4\lambda$.

Equation 8 also gives a good measure of how big is the piston error associated with the Phase Retrieval Algorithm. If we discount the piston wrap errors, the rms position error is 0.458% of a wave, which translates into an accuracy of $\lambda/218$. The error is due to data noise. We used Gaussian noise with standard deviation of 0.001 times the maximum size of the data. This gives rise to a very small piston estimation error. The performance is not seriously degraded until the Gaussian noise gets to a level of about 0.01 of the maximum data value. The Phase Retrieval Algorithm is very forgiving of Poisson-like counting noise. It operates without serious degradation down to a maximum count of about 50 counts on the brightest pixel.

FIG. 3(c) shows images generated for wavelength $\lambda_1=\lambda/1.1$. These are formed by subtracting the estimated phase, $\phi$, from the actual, unknown phase, $\theta$, a subtraction which is made by physically changing the parameters of each segment of the segmented aperture in accordance with the phase estimate, $\phi$. The new phase at wavelength $\lambda_1$ is, from Equation (4), $$\epsilon_1=1.1\epsilon. \quad (9)$$

In FIG. 3(c) $\epsilon_1$ is shown at 6, the infocus image is at 7, the diverse image is at 8, and the estimate, $\phi_1$, of $\epsilon_1$ is at 9. We note that the segment at 11, has value 440.78, which is 1.1 times greater than the value of the same segment at 10.

The first thing one notices in FIG. 3(c) is that the in-focus PSF at 7 looks as though it is not much degraded. But in fact it is badly degraded. Its Strehl ratio is 0.458. This is the penalty one takes at wavelength $\lambda_1=\lambda/1.1$ if the piston wraps are not removed. Images at wavelengths further removed from the center wavelength $\lambda$ will be more seriously degraded.

The diverse image at 8 was formed with the same defocusing lens as that which produced 3 in FIG. 3(a). It provides more defocus because it has more curvature at the smaller wavelength, $\lambda_1$. We also note that while the phase data at $\lambda_1$ is a factor of 1.1 larger than that at $\lambda$, the camera images are shrunk by that same factor; that is, there is a shift in magnification. We use an aperture 79 pixels wide in a 256 by 256 array so our data is oversampled by a factor of 128/79=1.62. Thus, a magnification shift of size 1.1 can be performed without loss of information.

The Phase Retrieval Algorithm forms the estimate $\phi_1$ of $\epsilon_1$ as shown at 9. It looks like the input at 6 but it has about 10 times less contrast. For example the segment at 12 has value 38.13. This should to be compared with the same segment at 11, whose value is 440.78. The piston value at 12 is about 10 times smaller. It is also quite close to the "modulo 100" value of 440.78, namely 40.78.

For completeness we list the new piston vector for $\phi_1$. It is $$P_1=[-11.04, -10.10, 8.05, -8.26, 6.52, -28.56, 8.28,\\
38.13, -1.02\ -0.194, 8.92, 0.00, -0.34, -1.09,\\
-10.26, -10.74, 18.18, -10.27]. \quad (10)$$

To convert this vector of piston phases at $\lambda_1$ to piston phases at $\lambda$, we multiply the vector by M=10 and quantize this to integer multiples of 100. Thus, the estimated phase-wrap vector, at wavelength $\lambda$ is $P_2$, $$P_2=[-100, -100, 100, -100, 100, -300, 100, 400, 0, 0, 100, 0, 0, 0, -100, -100, 200, -100]. \quad (11)$$

This is, essentially, the error vector $P_0$ in Equation 7. Also, $P_2$ contains only integer values of $\lambda$ so the Segment Controller will change the segment positions only by multiples of $\lambda$. This will not change the performance at $\lambda$, even if there are errors in $P_2$.

For clarity we note that the image at 9 in FIG. 3 is directly observable and that it looks just like the unobservable image at 5. This is the central result of the present invention: we determine the piston wraps at $\lambda$ by image-based measurements at $\lambda_1$.

More generally the equation for $P_2$ in terms of $P_1$ is $$P_2 = 100 \text{ Round}(M P_1/100.), \quad (12)$$

where M is the magnification factor defined in Equation 5.

In terms of the phase images at $\lambda_1$, $\phi_1$ is the estimated phase of $\epsilon_1$; and at $\lambda$, $\phi_2$ is the estimate of the residual phase $\epsilon$. The piston components of $\phi_1$ are in the piston vector $P_1$ and the piston components of $\phi_2$ are in the piston vector $P_2$. The equation relating $\phi_2$ to $\phi_1$ is, $$\phi_2 = 2\pi \text{ Round}(M \phi_1/(2\pi)), \quad (13)$$

which corresponds to Equation (12).

After making an adjustment of the aperture segments to remove piston wraps we can check the Strehl ratio, again, at wavelength $\lambda_1$. In this example the phase wraps were removed completely and the Strehl ratio at wavelength $\lambda_1$ is 0.998, a considerable improvement over the initial Strehl ratio of 0.458.

The following five variations to our present embodiment will be obvious to one skilled in the art. Our claims are written to cover these and other such variations.

(1) The present invention can be used with either a point source, as we describe in detail here, or with an extended source. Indeed phase diversity is known to have the ability to make a joint estimation of both the aberrating parameters of the optics and the extended object under observation, as was disclosed in U.S. Pat. No. 4,309,602. Thus, piston wraps can be sensed and eliminated with either a point object or an extended object as the source.

(2) Where there are only a few, small piston wraps in the phase it may be advantageous to use a small-phase approximation of the phase [18], which gives a closed form solution (instead of an iterative solution) to the phase estimation problem. This could be very useful in a real-time, imaging application.

(3) A diverse phase can be introduced into the optical system by changing the segment parameters, instead of using a lens, with no degradation in the accuracy of phasing the telescope. We used this variation on images at wavelength $\lambda_1$ to reduce the sharpness of the infocus PSF at $\lambda_1$. The pistons and tilts of the segmented aperture were changed to emulate a lens with (-½) the power of the defocus lens. This knocked down the peak of the sharp image and presented the Phase Retrieval Algorithm with two diverse images, of similar complexity, on opposite sides of best focus. The algorithm converged much quicker and without stagnation.

(4) If large piston wraps are expected then $\lambda_1$ must be very close to $\lambda$ and the procedure may make errors in estimating the size of a piston wrap. In computer simulations we found that the errors are small. That is, a piston wrap of size $6\lambda$ might be estimated as $5\lambda$. In such cases the procedure outlined here can be used iteratively, with increasing separation between $\lambda_1$ and $\lambda$, because the piston wraps will be smaller. Thus, repeating the procedure will increase the capture range.

(5) Equations (12) and (13) are simple thresholding operations which may not be optimal for estimation of the size of the piston wraps based on the image $\phi_1$, which is an estimate of the residual phase error, $\epsilon_1$, at wavelength $\lambda_1$. Other methods from detection theory, methods which use a more extensive model for formation of the noisy image $\epsilon_1$ and for the performance of the Phase Retrieval Algorithm which produces $\phi_1$, can be used to improve estimates of the sizes of the piston wraps.

APPENDIX

References Cited

| U.S. Patent Documents | | | |
|---|---|---|---|
| 3,842,509 | October 1974 | Wyman, et al. | Strain gauge ambiguity sensor for segmented mirror active optical system |
| 4,309,602 | January 1982 | Gonsalves, et al. | Wavefront sensing by phase retrieval |
| 4,946,280 | August 1990 | Horton | Wavefront analysis for segmented mirror control |
| 5,109,349 | April 1992 | Ulich, et al. | Actively controlled segmented mirror |
| 5,113,064 | June 1992 | Manhart | Method and apparatus for phasing segmented mirror arrays |
| 5,128,530 | July 1992 | Ellerbroek, et al. | Piston error estimation method for segmented aperture optical systems while observing arbitrary unknown extended scenes |
| 5,384,455 | January 1995 | Paxman, et al. | Measurement-diverse speckle imaging |
| 6,107,617 | August 2000 | Love, et al. | Liquid crystal active optics correction for large space based optical systems |
| 6,649,895 | November 2003 | Wirth | Dispersed Hartmann sensor and method for alignment and phasing, |
| 7,372,569 | May 2008 | Hutchin | Method of correcting alignment errors in a segmented reflective surface. |

OTHER REFERENCES

1. M Löfdhal and H Ericksson, "Resolving Piston Ambiguities when phasing a segmented mirror," SPIE 4013 (2000)
2. G Chanan, et al., "Phasing the Keck telescope with out-of-focus images in the infrared'" SPIE 43352 (1998)
3. D S Acton et al., "James Webb Space Telescope wavefront sensing and control algorithms," Proc. SPIE 5487 (2004)
4. D Carrara, et al., "Aberration correction of segmented-aperture telescopes using phase diversity," SPIE, 4123 (2000)
5. V Voitsekhovich, et al., "Co-phasing of segmented telescopes: A new approach to piston measurement," A&A 382 (2002)
6. T Huang, et al., "Zernike phase sensor for phasing of segmented telescopes," Applied Physics B 86 (2006)
7. J Salinas-Luna, et al., "Ronchi test can detect piston by means of the defocusing term," Optics Express 12 (2004)
8. S Esposito, et al., "Cophasing of segmented mirrors using the pyramid sensor," SPIE 5169 (2003)
9. B Dean et al., "Phase retrieval algorithm for JWST flight and testbed telescope," Proc. SPIE 6265 (2006)
10. R Gerchberg, W Saxton, "Phase determination from image and diffraction plane pictures in an electron-microscope," OPTIK 34 (1971)
11. D Misell, "A method for the solution of the phase retrieval problem in Electro-microscopy," J. Phys. D. 6 (1973)
12. R Gonsalves, "Phase retrieval from modulus data," JOSA, 66 (1976)
13. J Fienup, "Reconstruction of an object from the modulus of its Fourier transform," Opt Lett 3 (1978)
14. R Gonsalves, "Phase retrieval and diversity in adaptive optics," Opt. Eng., 21 (1982)
15. R Paxman, J Fienup, "Image-reconstruction for misaligned optics using phase diversity," JOSA A 3 (1986)
16. M Teague, "Image formation in terms of the transport equation," JOSA A 2 (1985)
17. F Roddier, "Curvature sensing and compensation: a new concept in adaptive optics," Appl Opt 27 (1988)
18. R Gonsalves, "Small-phase solution to the phase retrieval problem," Optics Letters 26 (2001)
19. R. Gonsalves, "Perspectives on image-based wavefront sensing," OSA Frontiers in Optics, Rochester, N.Y., October 2008

What is claimed is:

1. An image-based wavefront sensing apparatus to remove piston wraps from the segments of the segmented mirror of a telescope or other optical instrument, comprising:
   a digital camera configured to produce digital images;
   an actively controlled, segmented mirror which images a distant point source of light onto the digital camera;
   a lens to introduce defocus into the optical path between said mirror and said camera, as needed to image a defocused image on said camera;
   narrowband optical filters in the optical path between said mirror and said camera, as needed to image monochromatically at wavelengths $\lambda$ and $\lambda_1$ on said camera;
   a phase retriever to process diverse digital images, one in-focus and another out-of-focus, produced by the camera to produce an estimate, $\phi$, of the abreveating phase, $\theta$, formed by the segments of an unaligned mirror when it images the distant point source; and
   a segment controller to convert $\phi$ into a vector C of parameters to control the segmented mirror (about 3 to 6 parameters per segment) to remove the aberrating phase, $\theta$, and to produce a residual phase, $\epsilon = \theta - \phi$, in the segmented mirror.

2. The apparatus of claim 1 further comprising means for estimating and removing piston wraps which reside in the residual phase, $\epsilon$, of the segmented mirror by the steps of:
   changing the optical filter from wavelength $\lambda$ to wavelength $\lambda_1 = \lambda/F$, where $F = 1 + 1/(2R)$ and where $R\lambda$ is the amplitude of the largest piston wrap to be removed from the segmented mirror;
   producing diverse camera images at wavelength $\lambda_1$;
   processing by the phase retriever to process data taken at wavelength $\lambda_1$ to form an estimate, $\phi_1$, of the residual phase $\epsilon_1 = F\epsilon$ at wavelength $\lambda_1$, whereby $\phi_1$ is an observable image which is a scaled version of an unobservable image of piston wraps at wavelength $\lambda$;
   quantizing and scaling $\phi_1$, such that $\phi_2$ is an estimate of the piston wraps at wavelength $\lambda$ and defined as $$\phi_2 = 2\pi \, \text{Round}(M\phi_1/(2\pi)),$$

where M is a magnification factor given by $M = 1/(F-1)$;
   removing the estimate $\phi_2$ with the segment controller from the segmented mirror; and
   repeating the steps, with appropriate values of F, as necessary to complete alignment of the segmented mirror.

* * * * *